（12） United States Patent
Garware et al.

(10) Patent No.: US 11,859,060 B2
(45) Date of Patent: Jan. 2, 2024

(54) PROCESS FOR DYEING A HYDROLYSIS RESISTANT POLYESTER FILM

(71) Applicant: GARWARE HI-TECH FILMS LIMITED, Mumbai (IN)

(72) Inventors: Shashikant Bhalchandra Garware, Aurangabad (IN); Monika Shashikant Garware, Aurangabad (IN); Sonja Shashikant Garware, Maharashtra (IN); Sarita Garware Ramsay, Mumbai (IN)

(73) Assignee: GARWARE HI-TECH FILMS LIMITED, Mumbai (IN)

( * ) Notice: Subject to any disclaimer, the term of this patent is extended or adjusted under 35 U.S.C. 154(b) by 185 days.

(21) Appl. No.: 17/510,221

(22) Filed: Oct. 25, 2021

(65) Prior Publication Data

US 2022/0145016 A1 May 12, 2022

(30) Foreign Application Priority Data

Nov. 6, 2020 (IN) .............................. 202021048604

(51) Int. Cl.
*C08J 3/00* (2006.01)
*C08J 3/205* (2006.01)
*B29C 71/00* (2006.01)
*B29C 71/02* (2006.01)
*C08K 5/00* (2006.01)
*C08K 5/18* (2006.01)
*B29K 67/00* (2006.01)

(52) U.S. Cl.
CPC ......... *C08J 3/2053* (2013.01); *B29C 71/0009* (2013.01); *B29C 71/02* (2013.01); *C08K 5/005* (2013.01); *C08K 5/0041* (2013.01); *C08K 5/18* (2013.01); *B29C 2071/025* (2013.01); *B29K 2067/003* (2013.01); *B29K 2995/002* (2013.01); *B29K 2995/0097* (2013.01); *C08J 2367/02* (2013.01)

(58) Field of Classification Search
CPC ........ C08J 3/2053; C08J 2367/02; C08J 7/06; C08J 2367/00; B29C 71/0009; B29C 71/02; B29C 2071/025; B29C 2071/0018; C08K 5/0041; C08K 5/005; C08K 5/18; B29K 2067/003; B29K 2995/002; B29K 2995/0097; C09D 7/63
USPC ............................................................ 8/500
See application file for complete search history.

(56) References Cited

FOREIGN PATENT DOCUMENTS

CN       109535675 A  *  3/2019  ........... A01G 9/1438
WO    WO 2018206929 A1 * 11/2018 ............. B32B 27/10

* cited by examiner

*Primary Examiner* — Eisa B Elhilo
(74) *Attorney, Agent, or Firm* — LADAS & PARRY LLP

(57) ABSTRACT

The present disclosure relates to a process for dyeing a hydrolysis-resistant polyester film. The process comprises dyeing of a hydrolysis resistant polyester film in a dye bath comprising at least one coloring agent (dye), at least one polyhydric alcohol, and optionally at least one UV absorber to obtain a dyed film. The dyed film is subjected to quenching followed by cleaning and drying to obtain a dyed hydrolysis-resistant polyester film. The process of the present disclosure is simple, economical, improve hydrolysis resistance, and also retains the mechanical properties of the film when exposed to harsh environmental conditions.

18 Claims, 2 Drawing Sheets

PROCESS FOR DYEING A HYDROLYSIS RESISTANT POLYESTER FILM

FIELD

Figure 1:
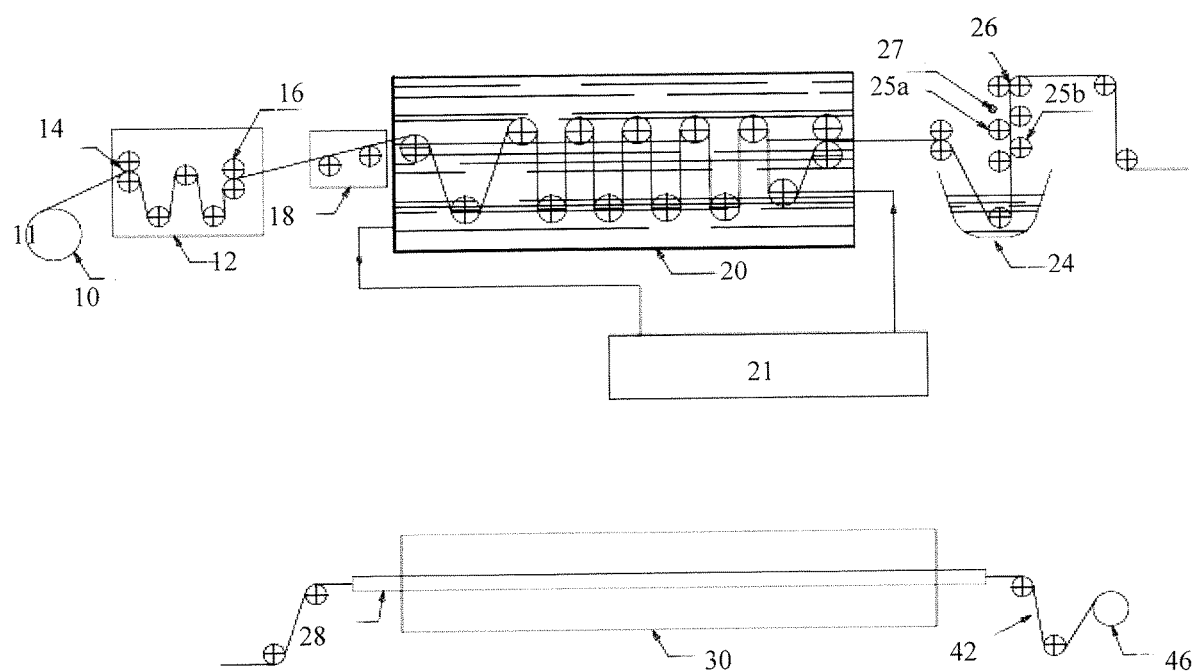

The present disclosure relates to a process for dyeing a hydrolysis resistant polyester film.

DEFINITIONS

As used in the present disclosure, the following terms are generally intended to have the meaning as set forth below, except to the extent that the context in which they are used indicates otherwise.

Tenter: The term "tenter" refers to a framework on which polymer can be held taut (tight) for drying or other treatment, during manufacture.

Inherent viscosity: The term "inherent viscosity" refers to a ratio of the natural logarithm of the relative viscosity to the concentration of the polymer in g/dL of the solvent.

Masterbatch technology: The term "masterbatch technology" refers to a concentrated mixture obtained by the distribution of colours and additives into a polymer carrier by heat treatment and a high shear mixing extruder.

BACKGROUND

The background information hereinbelow relates to the present disclosure but is not necessarily prior art.

Dyed polyester films have numerous applications including window applications, light filters (in research laboratories and industrial applications), decorative applications, packaging applications, and greenhouse applications.

The polyester films used in solar control applications, greenhouse applications, and packaging applications are exposed to natural weather conditions including prolonged exposure to direct sunlight or water, resulting in micro-cracking or hydrolysis of the polyester film.

Conventional methods of dyeing the film involve the incorporation of mixtures of blue, red, and yellow dyes in the polyester matrix while extrusion. However, it is not practical to produce small quantities of colored films by using this method, as colors cannot be changed in the production runs in a short time. Another method involving waterless dyeing or solvent-assisted dyeing is associated with a very high risk of explosion and a fire hazard. However, these films have poor hydrolysis resistance.

Therefore, there is felt a need to provide a process for dyeing a hydrolysis resistant polyester film that mitigates the drawbacks mentioned hereinabove.

OBJECTS

Some of the objects of the present disclosure, which at least one embodiment herein satisfies, are as follows.

It is an object of the present disclosure to ameliorate one or more problems of the prior art or to at least provide a useful alternative.

Another object of the present disclosure is to provide a process for dyeing a hydrolysis resistant polyester film wherein the dyed hydrolysis resistant polyester film has a controlled shrinkage and an improved hydrolysis resistance.

Yet another object of the present disclosure is to provide a process for dyeing a hydrolysis resistant polyester film.

Yet another object of the present disclosure is to produce dyed hydrolysis resistant polyester film having improved mechanical property when exposed to harsh environmental conditions.

Other objects and advantages of the present disclosure will be more apparent from the following description, which is not intended to limit the scope of the present disclosure.

SUMMARY

The present disclosure relates to a process for dyeing of a hydrolysis resistant polyester film. The process comprises dyeing a hydrolysis resistant polyester film in a dye bath comprising at least one coloring agent (dye), at least one polyhydric alcohol, and optionally at least one UV absorber, at a temperature in the range of 140° C. to 190° C. to obtain a dyed film. The dyed film is quenched in a first fluid medium to obtain a quenched film. The quenching is required to precipitate the dissolved additives. The quenched film is cleaned with a second fluid medium followed by scrubbing and rinsing to obtain a cleaned film. The so obtained cleaned film is subjected to drying in an oven at a temperature in the range of 130° C. to 250° C. to obtain the dyed hydrolysis resistant polyester film.

BRIEF DESCRIPTION OF THE ACCOMPANYING DRAWINGS

Figure 2:
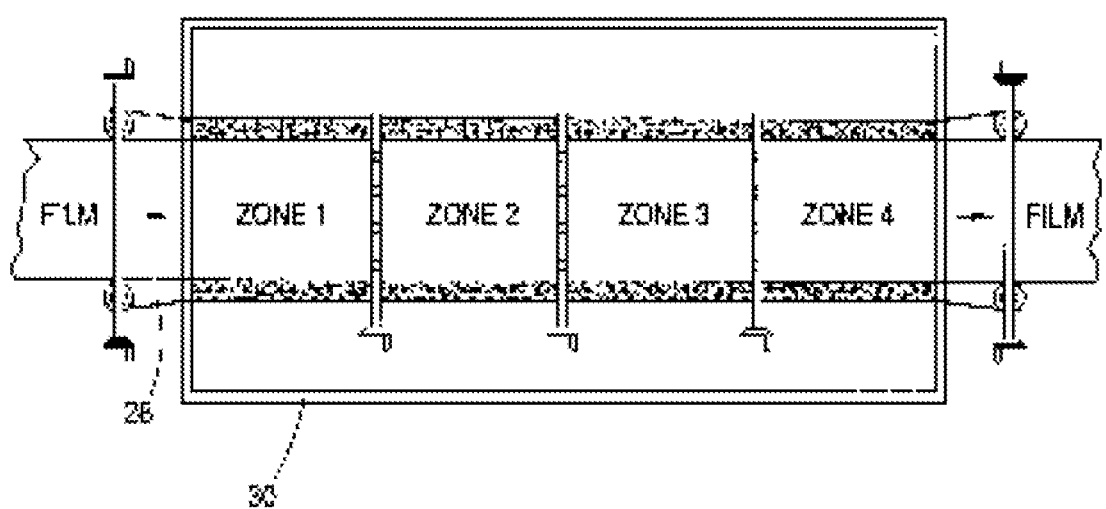

The present disclosure will now be described with the help of the accompanying drawing, in which:

FIG. 1 represents a schematic diagram showing a process for dyeing a hydrolysis resistant polyester film in accordance with the present disclosure; and FIG. 2 represents a cross-sectional view of an oven for treating the dyed hydrolysis resistant polyester film in accordance with the present disclosure.

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, known processes or well-known apparatus or structures, and well known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure are not to be construed as necessarily requiring their performance as described or illustrated. It is also to be understood that additional or alternative steps may be employed.

Conventional methods of dyeing the film involve the incorporation of mixtures of blue, red, and yellow dyes in the polyester matrix during extrusion. However, in practice, it is not feasible to produce small quantities of colored films by using this method, as colors cannot be changed in the production runs in a short time. Another method involving waterless dyeing or solvent-assisted dyeing.

In an aspect of the present disclosure, there is provided a process for dyeing a hydrolysis resistant polyester film.

The process is described in detail.

In a first step, a hydrolysis resistant polyester film is subjected to dyeing in a dye bath comprising at least one coloring agent (dye), at least one polyhydric alcohol, and optionally at least one UV absorber, at a temperature in the range of 140° C. to 190° C. to obtain a dyed film.

In an embodiment, the hydrolysis resistant polyester film is dyed for a time period in the range of 10 seconds to 120 seconds to obtain a dyed film. In an exemplary embodiment, the hydrolysis resistant polyester film is dyed for 60 seconds.

In accordance with an embodiment of the present disclosure, the thickness of the hydrolysis resistant polyester film prior to dyeing is in the range of 12 µm to 150 µm.

In accordance with an embodiment of the present disclosure, the coloring agent is a fast dye comprising blue color, yellow colour, and red colour. In an exemplary embodiment, the coloring agent is disperse blue 56.

In accordance with an embodiment of the present disclosure, the polyhydric alcohol is at least one selected from monoethylene glycol, diethylene glycol, propylene glycol, glyceraldehyde, and polyethylene glycol. In an exemplary embodiment, the polyhydric alcohol is monoethylene glycol.

In accordance with an embodiment of the present disclosure, the UV absorber is at least one selected from 2-hydroxybenzophenone, 2-hydroxybenzotriazole, organonickel compound, salicylic ester, cinnamic ester derivative, resorcinol monobenzoate, oxanilide, hydroxybenzoic ester, benzoxazinone, sterically hindered amine, and triazine.

In accordance with an embodiment of the present disclosure, the hydrolysis resistant polyester film is passed through the dye bath at a speed in the range of 5 meters/min to 80 meters/min. In an exemplary embodiment, the speed is 50 meters/min. Lower dyeing time is required for making lighter tints, whereas the process can run at higher speeds. Higher dyeing time is required for the production of darker tints. Dye uptake is directly proportional to the dye bath concentration and the dyeing time.

The dye bath of the present disclosure is equipped with SS Tank, supporting roller, and winder for passing the hydrolysis resistant polyester film through the bath. The dye bath is further equipped with an individual colour dispenser to maintain the color composition of the dye bath and a second doser to maintain the fluid medium concentration of the bath.

The polyester film is passed through the dye bath with the help of the rollers, which are in turn mounted in the dye bath in such a way that the film is completely immersed in the dye bath throughout the dyeing step.

After attaining the desired level of the UV stabilization and the color depth, the dyed films are monitored for UV absorbance, and the film is processed till it reaches the absorbance of >95% at 355 nm, preferably above >98% at 355 nm and is further passed to the next step.

In a second step, the dyed film is subjected to quenching in a first fluid medium to obtain a quenched film.

In accordance with an embodiment of the present disclosure, the first fluid medium is at least one selected from chilled demineralised water, polyhydric alcohol, diethylene glycol, and triethylene glycol. In an exemplary embodiment of the present disclosure, the first fluid medium is chilled demineralised water.

The quenching step is required to precipitate the dissolved additives such as undissolved free dust, dyes, UV absorber, and polyester oligomers in the dye bath. The film surface has a thin layer of solvent along with undissolved dust, UV absorber, dissolved dyes, and polyester oligomers. The film is quenched with the first fluid medium that precipitates the dissolved additives onto the film surface. The precipitated free dust is removed by a high velocity solvent spray or an ultrasonic energy.

The temperature of the chilled water is maintained between −5° and 10° C. The film surface has a thin layer of the solvent along with undissolved free dust, UV stabilizer, and polyester oligomers. When the film is suddenly quenched in the chilled water, the dissolved additives are precipitated onto the film surface. Thus precipitated free dust can be removed by a high-velocity solvent spray. Ultrasonic energy can also be applied to remove particles from the film.

In a third step, the quenched film is cleaned with a second fluid medium followed by scrubbing and rinsing to obtain a cleaned film.

In accordance with an embodiment of the present disclosure, the second fluid medium is selected from dimethylformamide, santosol, benzoyl alcohol, 2-vinyl-pyrrolidone, dimethyl sulfoxide, and dimethylacetamide. In an exemplary embodiment, the second fluid medium is dimethyl formamide.

The second fluid medium used for cleaning the dyed hydrolysis resistant polyester film has a boiling point in the range of 110° C. to 220° C.

The second fluid medium with a boiling point above 110° C. is preferred because the chilled water carried along with the film will accumulate in the fluid media. After a certain frequency, the same can be separated from this fluid media by distillation. Solvents with higher boiling point are preferred since they posses' higher solvation power and offers process safety.

Since the film is continuously passing through the fluid media, some quantity of unwanted surface contamination affects the purity of the fluid medium in the tank and therefore it is necessary to remove some quantity of used solvents at predetermined intervals from the tank and simultaneously add an equivalent quantity of pure fluid medium into the tank. The distillation of the used fluid medium is carried out under a high vacuum and at relatively low temperatures and the distilled fraction of used fluid medium is recycled for washing. The residual dye along with fluid medium in the distillation vessel can be recycled.

The cleaning by using the second fluid medium is followed by scrubbing the cleaned film and rinsing it with water to obtain a cleaned film. The scrubber assembly is provided with a self-cleaning device in which a high-pressure jet is provided before squeezing the film between nip rollers. A set of eight rollers is mounted on the scrubbing tank, out of which the four rollers are mounted on the top side of the film and remaining four rollers are mounted on the opposite side of the film. Each roller is wound with cloth and lapping movement is also provided to minimize the pressure of the scrubbing material on the film, depending on the type and thickness of the film to be cleaned. In an embodiment, water in the process is continuously recycled and filtered through 0.3 micron cartridge filters.

The dyed hydrolysis resistant polyester film is passed through a specially designed tenter chain. The tenter having two parallel chain tracks is provided with digital width indications mounted across the length of the chain to monitor width at various locations. The tenter chain plays a major role in monitoring the shrinkage property of the dyed hydrolysis resistant polyester film. The desired shrinkage values can be monitored by adjusting the width of the web from the entrance and exit ends of the tenter. The cleaned film passes through the tenter where the specially designed clips hold the film tightly in the lower and upper jaws. The jaws are provided with a soft rubber lining, which helps in holding the film tightly in the jaws.

In a final step, the cleaned film is subjected to drying in an oven at a temperature in the range of 50° C. to 250° C. In an embodiment, the cleaned film is fed into the oven at temperatures maintained between 100° C. and 200° C. and at a speed of 20 to 80 meters/min.

In an embodiment, the cleaned film is dried for a time period in the range of 10 seconds to 70 seconds. In an exemplary embodiment, the cleaned film is dried for 30 seconds.

The film can be allowed to shrink in the oven or can be stretched in the oven in the transverse or machine direction. In the first zone, the film is allowed to shrink between 0 and 150 mm across the transverse direction, preferably between 2 mm and 50 mm. The films are stretched in the second zone and the third zone between 0 and 300 mm. The films are stretched in the second zone and the third zone is allowed to stabilize and relax in the fourth zone. The film produced in the tenter process has excellent shrinkage properties. The shrinkage values in the machine direction (MD) and traverse direction (TD) are controlled consistently lot to lot and roll to roll to obtain a dimensionally stabilized film.

This dimensionally stabilized film is then cooled with cold air jets. The dyed film is finally wound on a paper or metal core of a winder. The dyed hydrolysis resistant polyester film obtained by using the process of the present disclosure receives an accelerated weathering test and tests for sun control capability, light fastness, and thermal properties.

Carboxyl end-groups present in the polyester molecule are primarily responsible for the hydrolytic degradation of polyesters, including polyethylene terephthalate. The polyester resin degrades during the extrusion process followed by an increase in —COOH end groups. Generally, the —COOH content of the polyester resin is reduced by passing through the solid-state polymerization process. However, the polyester resin having —COOH end groups lower than ten that typically has a very high IV (inherent viscosity) that makes processing and extrusion difficult because of processing issues such as high pressure at filters and high torque at extruders.

In an embodiment, the hydrolysis resistant polyester film comprises polyester resin, hydrolysis restricting stabilizer, UV stabilizer, and anti-oxidant.

In an embodiment, the polyester resin present in an amount in the range of 80 wt % to 97 wt % based on the total weight of hydrolysis resistant polyester film. The polyester resin has an inherent viscosity (IV) of 0.65 to 0.75 wherein the inherent viscosity (IV) lower than 0.65 may result in a high —COOH content that leads to degradation which is too high, and the inherent viscosity (IV) higher than 0.75 is difficult to process into films.

In the present disclosure, the incorporation of the hydrolysis restricting stabilizer into the polyester resin is carried out, which acts as an end-group capper by reacting with the carboxyl end-groups of the polyester.

The hydrolysis resistant polyester film comprises at least one hydrolysis resistant stabilizer selected from the group consisting of carbodiimide compound and glycidyl ester of branched mono-carboxylic acid. Typically, the content of the hydrolysis stabilizer is in the range from 0.1 to 10.0% by weight, preferably in the range of 1.0 to 6.0% by weight, and more preferably in the range of 0.5 to 4.0% by weight, based on the weight of the film.

In an embodiment, the carbodiimide compound is selected from the group consisting of dicyclohexyl carbodiimide, diisopropyl carbodiimide, di-isobutyl carbodiimide, dioctyl carbodiimide, octyl decyl carbodiimide, dibenzyl carbodiimide, diphenyl carbodiimide, N-benzyl-N-phenyl carbodiimide, di-p-toluyl carbodiimide, preferably bis(2,6 di isopropyl phenyl)carbodiimide and 2,6,2',6'-tetra isopropyl diphenyl carbodiimide.

In one embodiment, the hydrolysis resistant stabilizer can be directly added to the extruder during the production of the film.

In one embodiment, the hydrolysis resistant stabilizer can also be introduced by way of a masterbatch technology. The masterbatch of Glycidyl ester of branched mono-carboxylic acid can be added to PET chip in the hopper of a twin-screw extruder provided with vacuum to remove moisture. The mixture can be melt-extruded to obtain the hydrolysis-resistant polyester film.

The hydrolysis resistant stabilizer reacts with the polyester at an elevated temperature in the range of 140° C. and 300° C. The hydrolysis stabilizer can be introduced at various stages during the filmmaking process.

The hydrolysis resistant film can further comprise additives such as anti-oxidant. The anti-oxidant is selected from the group consisting of peroxide-decomposing antioxidants, hindered phenols, secondary aromatic amines, and hindered amines. The peroxide-decomposing antioxidants is selected from the group consisting of trivalent phosphorous compounds, such as phosphonites, phosphites (e.g. triphenyl phosphate and trialkylphosphites), and thiosynergists (e.g. esters of thiodipropionic acid, such as dilauryl thiodipropionate). The hindered phenol, such as tetrakis-(methylene 3-(4'-hydroxy-3',5'-di-t-butylphenyl propionate) methane; pentaerythritol Tetrakis(3-(3,5-di-tert-butyl-4-hydroxyphenyl)propionate); octadecyl-3-(3,5-di-tert.butyl-4-hydroxyphenyl)-propionate; Ethylene bis (oxyethylene) bis(3-tert-butyl-4-hydroxy-5(methylhydrocinnamate); N,N'-Hexamethylene-bis (3,5-di-tert-butyl-4-hydroxyhyrocinnamamide); 3,5-Di-tert-butyl-4-hydroxyhydrocinnamic acid, C7-9 125643-61-0 branched alkyl esters; and bis-(1-Octyloxy-2,2,6,6,tetramethyl-4-piperidinyl) sebacate can be used.

The concentration of the antioxidant present in the polyester film is in the range of 50 ppm to 5000 ppm, preferably in the range of 300 ppm to 1200 ppm, more preferably in the range from 450 ppm to 600 ppm.

Further, optionally UV stabilizers can be added to the polyester film. UV stabilizers are the chemical compounds that can intervene in the physical and chemical processes of light-induced polymer degradation. The UV stabilizers have an extinction coefficient much higher than that of the polyester such that, most of the time UV light is absorbed by the UV stabilizers rather than the polyester. The UV stabilizers generally dissipate the absorbed energy as heat, thereby avoiding degradation of the polymer chain, and improving the stability of the polyester to UV light.

UV stabilizer is at least one selected from the group consisting of 2-hydroxybenzophenones, 2-hydroxybenzotriazoles, organonickel compounds, salicylic esters, cinnamic ester derivatives, resorcinol monobenzoates, oxanilides, hydroxybenzoic esters, benzoxazinones, sterically hindered amines, and triazines, preferably 2-hydroxybenzotriazoles, benzoxazinones, and triazines. In an embodiment, the UV stabilizer is Cyasorb UV 3638, Tinuvin 1577, and their mixture thereof.

The concentration of the UV stabilizers is in the range of 0.1 to 5.0% by weight with respect to the total weight of the film, preferably in the range of 0.5 to 3.0% by weight with respect to the total weight of the film.

In an embodiment, the dyed hydrolysis resistant polyester film obtained by the process of the present disclosure is characterized by having a) lightfastness for more than 2000 hours;
b) thermal stability for 1000 hours;
c) tensile strength greater than 40 kgf/cm$^2$ after 72 hours of autoclave;
d) elongation at break of at least 40%; and
e) a visible light transmittance in the range of 2% to 82%.

The dyed hydrolysis resistant polyester film produced by the process of the present disclosure has a visible light transmittance as low as 2% and as high as 82%. The films can be produced in various shades. The concentration of various dyes in the dye bath and the temperature kept during dyeing decide the final color and transmission of the substrate. The speed of the process and the concentration of dyes in the dye bath determines the visible light transmission properties.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAILS

Example 1: Process for Dyeing Hydrolysis Resistant Polyester Films in Accordance with the Present Disclosure Hydrolysis resistant polyester films with a thickness of 12 μm, 23 μm, 36 μm, 50 μm and 100 μm (produced by Garware Hi-Tech Films Ltd) were used for dyeing hydrolysis resistant polyester films. The process was described herein below with the help of FIG. 1.

The hydrolysis resistant polyester film 10 was placed on unwinder 11. The polyester film was passed through a dye bath 12 at a speed of 50 meters/min, followed by squeezing between nip roller 16 of dyeing bath 12 to obtain a dyed film. The temperature of the dyeing bath 12 was maintained at 180° C. The dye bath comprises disperse blue 56 and monoethylene glycol. The hydrolysis resistant polyester film was dyed for 60 seconds in the dye bath.

The shrinkage properties of the film were adjusted by stretching the film. MD (machine direction) stretching was done by monitoring differential speeds of nip rollers 14 and squeezing nip rollers 16.

The dyed film is quenched in chilled demineralized water maintained at 5° to 20° C. in quenching apparatus 18, to obtain a quenched film.

The quenched film was then passed through a cleaning apparatus 20, and dimethyl formamide (fluid medium) was sprayed with high velocity on the film surface to remove excess chemicals and free dust adhered to the film. The fluid medium from the cleaning apparatus 20 was purified in a distillation unit 21.

Further, the cleaning of the dyed film took place in scrubbing tank 24, wherein the film was passed through a mechanical scrubber including a set of 8 rollers (25 a and 25 b). Each roller or bar was provided with a pneumatic cylinder to increase or decrease the abrasion pressure on the film.

The water in the scrubbing tank 24 was mixed with non-ionic surfactant i.e., LISSAPOL-PA (soap solution) and continuously spread on the scrubbing rolls. The mechanical scrubber was a self-cleaning device provided with a high pressure jet 27 before squeezing the film in the nip rollers. Water was continuously recycled and filtered through 0.3 μm cartridge filters.

The treated and cleaned dyed hydrolysis resistant polyester film was then passed through tenter 28, as shown in FIG. 2. The tenter had two parallel chain tracks. The tenter chain was further equipped with an oven having four separate zones, each zone was provided with hot air nozzles and showers mounted on the top and bottom sides of the film. Temperature and airflow were individually monitored.

Further, the film was fed through the oven at temperatures of 100° C. to 200° C. in four zones for a period of 30 seconds.

The film was allowed to shrink in a transverse direction in a first zone, width control in a second zone, heat stabilization in a third zone, and transverse direction in a fourth zone, followed by stabilization in the fourth zone. The stabilized film was allowed to cool by using high-velocity cold air jets to obtain the dyed hydrolysis resistant polyester film, which was finally wound on a metal core at rewinder 46.

Further, the roll produced in the above process was slit to the desired length and width.

The dyed hydrolysis resistant film obtained in accordance with the process of the present disclosure has a uniform color and transmittance, throughout the length and width of the film (roll). The transmission variation across the web width is 2% and UV transmittance is below 2%.

Characteristics of the dyed hydrolysis-resistant polyester film are given below in

TABLE 1

| Film Thickness in μ | Oven Temperature ° C. | | | | Shrinkage in % | | Optical Density at 355 nm | Visible Light Transmittance |
|---|---|---|---|---|---|---|---|---|
| | Zone I | Zone II | Zone III | Zone IV | TD | MD | | |
| 23 | 185 | 185 | 185 | 180 | −0.4 | 2 | 1.8 | 20.5 |
| 36 | 185 | 185 | 185 | 180 | −0.4 | 2 | 1.8 | 20.3 |

PET film width between 40" to 72"
MD = Machine Direction
TD = Transverse Direction It is observed that shrinkage, optical density, visible light transmittance properties of films with a thickness of 23 or 36 microns are similar. The films have uniform dye uptake across web width and length with good optical quality.

Example 2

Hydrolysis resistant polyester films having a thickness of 23 and 36 μm were used for obtaining the dyed hydrolysis resistant polyester films. A similar process as described in Example 1 and shown in FIG. 1 was followed, except that there were modifications in the tenter and the oven settings. The temperature of the oven was set at 185° C.

The results are given below in Table 2, with the film stretched in TD direction at various stretch ratios.

TABLE 2

| Sr. No. | Stretching Ratio | 23μ film Shrinkage % MD | 23μ film Shrinkage % TD | 36μ film Shrinkage % MD | 36μ film Shrinkage % TD |
|---|---|---|---|---|---|
| 1 | 0.997 | 2 | −0.4 | 2.2 | −0.2 |
| 2 | 1.009 | 1.8 | 0 | 1.6 | 0.2 |
| 3 | 1.018 | 1.6 | 0.2 | 1.2 | 0.6 |

It is observed that the shrinkage properties in the transverse direction can be adjusted by changing the stretching ratio. The shrinkage behaviour of films with a thickness of 23 or 36 microns is not the same at a given stretching ratio.

Example 3: Pressure Cooker Test

The pressure cooker test wherein controlled conditions of high temperature and high relative humidity was provided for accelerated conditions of aging, to evaluate the dyed hydrolysis resistant polyester film.

The dyed hydrolysis resistant polyester film obtained in Examples 1 and 2 were cut in 10 mm width and length 150 mm.

These samples were kept in a pressure cooker at a pressure of 1.0 kg/cm$^2$ and a temperature of 121° C. The mechanical properties of the dyed hydrolysis-resistant polyester film were evaluated at regular time intervals.

The tensile strength of the dyed hydrolysis-resistant polyester film of the present disclosure (10 mm width samples) was determined according to ASTM D882 at a jaw separation rate of 300 mm/min. The tensile strength was determined according to ASTM D882 by using a material test machine (Instron model no 4411H), using mechanical grips with rubber jaw faces at a temperature 23° C. and relative humidity of 50%. The samples were evaluated for elongation at break of the polymer. The results are provided in table 3 below.

TABLE 3

Mechanical Property.

| Sr. No. | Film Type | Property | Unit | Initial after dyeing | 24 HRS Autoclave | 48 HRS Autoclave | 72 HRS Autoclave |
|---|---|---|---|---|---|---|---|
| 1 | Control-1* | Tensile Strength | kgf/cm$^2$ | 100 | 80 | 59 | Brittle |
|   |   | Elongation at break | % | 100 | 78 | 56 | Brittle |
| 2 | Control-2** | Tensile Strength | kgf/cm$^2$ | 100 | 90 | 74 | Brittle |
|   |   | Elongation at break | % | 100 | 84 | 10 | Brittle |
| 3 | Hydrolysis Resistance 36μ Film | Tensile Strength | kgf/cm$^2$ | 100 | 89 | 80 | 69 |
|   |   | Elongation at break | % | 100 | 89 | 74 | 61 |
| 4 | Hydrolysis Resistance 100μ Film | Tensile Strength | kgf/cm$^2$ | 100 | 95 | 79 | 64 |
|   |   | Elongation at break | % | 100 | 95 | 84 | 44 |

Initial values are considered as 100% and retention values are calculated in terms of percentage.
Residence time in Dye bath was 30 seconds at 175° C.
Autoclave with temp 121° C. and pressure 1.0 psi.
Samples were collected after a regular interval of 24 hours up to 96 hours for testing purpose.
*Control-1:-23 micron polyester film manufactured by Garware Hi-Tech Films Ltd without UV and Hydrolysis stabilized.
**Control-2:-36 micron polyester film manufactured by Garware Hi-Tech Films Ltd without UV and Hydrolysis stabilized.

It is evident from the above table that, the dyeing of the hydrolysis resistant polyester films further enhances hydrolysis resistance as established by using the accelerated aging tests. Whereas the conventional films are brittle after exposure to humidity and temperature.

The use of the hydrolysis resistant polyester film provides extended mechanical property retention when exposed to harsh environmental conditions. Therefore, the dyed hydrolysis resistant polyester film of the present disclosure has an improved long-term hydrolytic stability.

Example 4: Thermal Stability

The thermal stability of the dyed hydrolysis resistant polyester films of the present disclosure was determined according to ASTM D1204-94. The films were placed in an oven at 150° C. for 30 minutes and evaluated.

The films are found to have good thermal aging properties for 1000 hrs.

Example 5: Light Fastness

The lightfastness of the dyed hydrolysis resistant polyester films of the present disclosure was determined by using the accelerated weathering tester of Atlas UV test and Xenon Arc Weatherometer (atlas company). The films were exposed continuously to alternate cycles of light and dark; and monitored for changes.

The films are found to withstand exposure for more than 2000 hours.

TECHNICAL ADVANCEMENTS

The present disclosure described hereinabove has several technical advantages including, but not limited to, the realization of a process for dyeing a hydrolysis resistant polyester film that:

- is capable of providing the film with improved hydrolysis resistance and elasticity;
- maintains mechanical properties when exposed to harsh environmental conditions;
- is a simple and economical process of dying;
- produces the film in various shades; and
- produces the film which has a visible light transmittance as low as 2% and as high as 82%.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions, and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for dyeing of a hydrolysis resistant polyester film, said process comprising the following steps:
   a. dyeing a hydrolysis resistant polyester film in a dye bath comprising at least one coloring agent (dye), at least one polyhydric alcohol and optionally at least one UV stabilizer, at a temperature in the range of 140° C. to 190° C. to obtain a dyed film;
   b. quenching said dyed film in a first fluid medium to obtain a quenched film;
   c. cleaning said quenched film with a second fluid medium followed by scrubbing and rinsing to obtain a cleaned film; and
   d. drying said cleaned film in an oven at a temperature in the range of 50° C. to 250° C. to obtain the dyed hydrolysis resistant polyester film.

2. The process as claimed in claim 1, wherein prior to dyeing, a thickness of said hydrolysis resistant polyester film is in the range of 12 μm to 150 μm.

3. The process as claimed in claim 1, wherein said coloring agent is at least one selected from blue color, yellow colour, and red colour.

4. The process as claimed in claim 1, wherein said polyhydric alcohol is at least one selected from monoethylene glycol, diethylene glycol, propylene glycol, glyceraldehyde, and polyethylene glycol.

5. The process as claimed in claim 1, wherein said UV stabilizer is at least one selected from 2-hydroxybenzophenone, 2-hydroxybenzotriazole, organonickel compound, salicylic esters, cinnamic ester derivative, resorcinol monobenzoate, oxanilide, hydroxybenzoic ester, benzoxazinone, sterically hindered amine, and triazine.

6. The process as claimed in claim 1, wherein said hydrolysis resistant polyester film is passed through said dye bath at a speed in the range of 5 meters/min to 80 meters/min.

7. The process as claimed in claim 1, wherein said first fluid medium is at least one selected from chilled demineralised water, polyhydric alcohol, diethylene glycol, and triethylene glycol.

8. The process as claimed in claim 1, wherein said second fluid medium is at least one selected from dimethylformamide, santosol, benzoyl alcohol, 2-vinyl-pyrrolidone, dimethyl sulfoxide, and dimethylacetamide.

9. The process as claimed in claim 1, wherein said second fluid medium has a boiling point in the range of 110° C. to 220° C.

10. The process as claimed in claim 1, wherein said hydrolysis resistant polyester film in step a) is dyed for a time period in the range of 10 seconds to 120 seconds.

11. The process as claimed in claim 1, wherein said cleaned film in step d) is dried for a time period in the range of 10 seconds to 70 seconds.

12. The process as claimed in claim 1, wherein said dyed hydrolysis resistant polyester film is characterized by having
    a. a lightfastness for more than 2000 hours;
    b. a tensile strength greater than 40 kgf/cm$^2$ after 72 hours of autoclave;
    c. an elongation at break of at least 40%; and
    d. a visible light transmittance in the range of 2% to 82%.

13. The process as claimed in claim 1, wherein said hydrolysis resistant polyester film comprising: 80 wt % to 97 wt % polyester resin, 0.1 wt % to 10 wt % hydrolysis restricting stabilizer, 0.1 wt % to 5.0 wt % UV stabilizer, and 0.005 wt % to 0.5 wt % anti-oxidant based on the total weight of hydrolysis resistant polyester film.

14. The process as claimed in claim 13, wherein said polyester resin has an inherent viscosity in the range of 0.65 to 0.75.

15. The process as claimed in claim 13, wherein said hydrolysis restricting stabilizer is at least one selected from carbodiimide compound and glycidyl ester of branched mono-carboxylic acid.

16. The process as claimed in claim 13, wherein said anti-oxidant is at least one selected from peroxide-decomposing antioxidants, hindered phenols, secondary aromatic amines, and hindered amines.

17. The process as claimed in claim 13, wherein said UV stabilizer is at least one selected from 2-hydroxybenzophenones, 2-hydroxybenzotriazoles, organonickel compounds, salicylic esters, cinnamic ester derivatives, resorcinol monobenzoates, oxanilides, hydroxybenzoic esters, benzoxazinones, sterically hindered amines, and triazines.

18. The process as claimed in claim 13, wherein said UV stabilizer is at least one selected from 2-hydroxybenzotriazoles, benzoxazinones, and triazines.

\* \* \* \* \*